(12) United States Patent
Greilinger et al.

(10) Patent No.: US 9,101,523 B2
(45) Date of Patent: Aug. 11, 2015

(54) TABLE HAVING AT LEAST ONE GUIDE UNIT

(71) Applicants: Daniel Greilinger, Wenslingen (CH); Marcel Soltermann, Seltisberg (CH)

(72) Inventors: Daniel Greilinger, Wenslingen (CH); Marcel Soltermann, Seltisberg (CH)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 13/932,227

(22) Filed: Jul. 1, 2013

(65) Prior Publication Data

US 2014/0007348 A1    Jan. 9, 2014

(30) Foreign Application Priority Data

Jul. 5, 2012 (DE) .......................... 10 2012 211 712

(51) Int. Cl.
| | | |
|---|---|---|
| A47B 7/00 | (2006.01) | |
| A61G 13/06 | (2006.01) | |
| A61G 13/02 | (2006.01) | |
| A61G 13/12 | (2006.01) | |
| A61G 7/012 | (2006.01) | |
| A61G 7/018 | (2006.01) | |
| F16H 25/20 | (2006.01) | |

(52) U.S. Cl.
CPC ............... *A61G 13/06* (2013.01); *A61G 13/02* (2013.01); *A61G 13/129* (2013.01); *A61G 7/012* (2013.01); *A61G 7/018* (2013.01); *F16H 2025/2059* (2013.01)

(58) Field of Classification Search
CPC ......... A61G 7/018; A61G 7/012; A61G 7/05; A61G 13/06; A47C 19/045; A47B 9/00; A47B 9/20; A47B 9/04; A47B 21/02

USPC ............... 5/11, 611, 600; 254/2 C, 93 L, 8 C; 108/144.11, 147, 147.19, 20
See application file for complete search history.

(56) References Cited

U.S. PATENT DOCUMENTS

| | | | |
|---|---|---|---|
| 4,589,642 A | | 5/1986 | Schnelle et al. |
| 5,172,442 A | * | 12/1992 | Bartley et al. ..................... 5/611 |
| 5,490,297 A | * | 2/1996 | Bradcovich et al. .............. 5/601 |
| 6,382,039 B1 | * | 5/2002 | Choi ............................ 74/89.35 |
| 6,435,048 B1 | * | 8/2002 | Zimmerman ................ 74/89.35 |
| 8,028,359 B2 | * | 10/2011 | Parson et al. ..................... 5/619 |
| 2008/0178779 A1 | * | 7/2008 | Agee .............................. 108/147 |
| 2008/0237417 A1 | * | 10/2008 | Liu ............................. 248/188.4 |
| 2011/0099716 A1 | * | 5/2011 | Jackson ............................ 5/607 |

FOREIGN PATENT DOCUMENTS

| | | |
|---|---|---|
| DE | 1988691 U | 7/1968 |
| DE | 3328908 A1 | 2/1985 |
| DE | 20218832 U1 | 3/2003 |

* cited by examiner

*Primary Examiner* — Timothy D Collins
*Assistant Examiner* — Richard G Davis
(74) *Attorney, Agent, or Firm* — Bryan Peckjian; SKF USA Inc. Patent Dept.

(57) ABSTRACT

A table for supporting a recumbent patient includes at least one tabletop unit, at least one ground contact unit for supporting the tabletop unit, a first and at least one second adjustment unit for changing a spacing between the ground contact unit and the tabletop unit, and at least one first guide unit for guiding movement of the tabletop unit relative to a the ground contact unit, where at least a part of the guide unit is disposed between the first and the at least one second adjustment unit.

17 Claims, 1 Drawing Sheet

TABLE HAVING AT LEAST ONE GUIDE UNIT

CROSS REFERENCE

This application claims priority to German patent application no. 10 2012 211 712.1 filed on Jul. 5, 2012, the contents of which are fully incorporated herein by reference.

TECHNICAL FIELD

The present invention is directed to a table for supporting a patient and includes a tabletop unit and a base, first and second height adjustment units and at least a guide unit for guiding movements of the tabletop unit relative to the base.

DESCRIPTION OF THE RELATED ART

A table having a tabletop, a base and two telescoping extensions is known. The extensions guide movement between the tabletop and the base. In this known table, a unit for changing a spacing between tabletop and base is disposed between the telescoping extensions.

SUMMARY

As aspect of the invention is to provide a table of the above-described type with an inexpensive and stable construction. This is achieved, in part, by providing first and second adjustment units and by providing at least part of the guide unit between the first and second adjustment units.

Another aspect of the invention comprises a table, in particular a table for supporting a recumbent patient, including at least one tabletop unit and at least one base or ground contact unit for transmitting the weight of the table, at least to a large extent, to a floor or to the ground. The table includes a first and at least one second adjustment unit, which are provided to change a spacing between the base unit and the tabletop unit, and at least one first guide unit, which is provided for guiding movement of the tabletop unit relative to the base unit.

It is provided that at least one part of the guide unit is disposed between the first and the second adjustment units. "Provided" should be understood in particular to mean specifically designed and/or specifically equipped and or specifically programmed. That at least one part of the guide unit is disposed "between" the first and the second adjustment units, should be understood to mean that the part is disposed between a first plane and a second plane, wherein a line, which intersects the center of gravity of the first adjustment unit and the center of gravity of the second adjustment unit is perpendicular to the two planes, and intersects the first plane of the first adjustment unit, and intersects the second plane of the second adjustment unit. A "large part" shall be understood to mean at least 50%. An inexpensive and stable construction can be achieved with this inventive design. For example, with the inventive configuration, the table does not tip or tilt even with an off-center load. That is, even when the tabletop unit is loaded at one region an end of the tabletop unit (an end with respect to a direction which leads from a center of gravity of the first adjustment unit to a center of gravity of the second adjustment unit), there is a low risk of tipping the table. A high stability of the table can thus be achieved even when a portion of the table is pulled out or extended.

For a table and a base each having a length and a width, the length being longer than the width, a spacing between the first adjustment unit and a longitudinal end of the base is smaller than one tenth of the maximum length of the base in its longitudinal direction. Thus a high stability of the table with respect to tipping movements can be achieved.

Further advantages will become apparent from the following description of the drawings. In the drawings, an exemplary embodiment of the invention is illustrated. The drawings, the description, and the claims contain numerous features in combination. A person of ordinary skill in the art will advantageously consider the features individually as well as in further meaningful or expedient combinations.

DETAILED DESCRIPTION OF THE INVENTION

Figure 1:
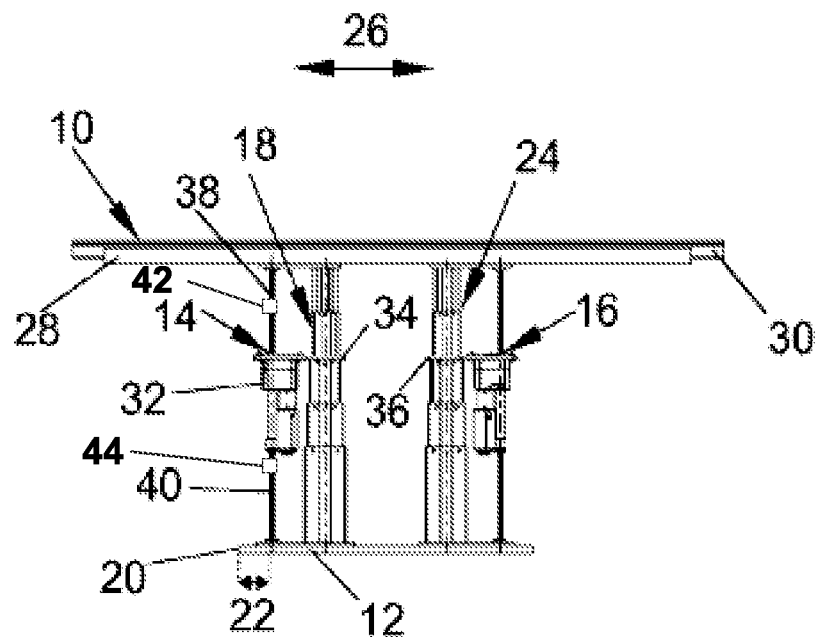
FIG. 1 shows a side view of a table having a tabletop unit and a base unit according to an embodiment of the present invention, with the tabletop unit in a first operating configuration.

FIG. 1 shows a side view of an inventive table for supporting a recumbent patient for treatment by a doctor. The table includes a tabletop unit 10 and a base unit or ground contact unit 12, which transmits the weight of the table and the patient to the floor or ground. The table further includes a first and a second adjustment unit 14, 16, which are identical in construction and are provided to adjust a spacing between the tabletop unit 10 and the ground contact unit 12. The first adjustment unit 14 includes a first and a second lead screw or threaded spindle 38, 40 and a drive 32 such as a motor. The first adjustment unit 14 is attached by an attachment element 34 to the guide unit 18 with respect to a longitudinal direction 26 of the tabletop unit. Furthermore, the first adjustment unit 14 includes two spindle nuts 42, 44 (not shown), and a first one of the spindle nuts 42 is screwed onto the first threaded spindle 38 and a second one of the spindle nuts 44 is screwed onto the second threaded spindle 40. The first threaded spindle 38 is attached to the tabletop unit 10, and the second threaded spindle 40 is attached to the ground contact unit 12. In an operating procedure in which the spacing between the ground contact unit 12 and the tabletop unit 10 is adjusted, the drive 32 drives the two spindle nuts 42, 44 so that the first and second threaded spindles 38, 40 move either toward each other or away from each other. An operation of the adjustment unit 16 is analogous to the described operation of the adjustment unit 14. The drives 32 of the adjustment units 14, 16 operate simultaneously and at the same speed. However, the drives 32 can also be driven independently.

The guide unit 18 is a telescoping extension unit and is formed by a plurality of cylindrical components that are retractable into one another, and these components are each movable rectilinearly with respect to one another. A topmost one of these components is attached to the tabletop unit 10, and a bottommost one of the components is attached to the ground contact unit 12. Furthermore, the table has a second guide unit 24, which is identical to the guide unit 18. During an adjusting operation by the adjustment units, the guide units 18 and 24 guide a rectilinearly extending movement of the tabletop unit 10 relative to the ground contact unit 12.

The guide units 18, 24 are disposed between the adjustment units 14, 16. A line (not illustrated) that intersects the first adjustment unit 14 at a first point, the second adjustment unit 16 at a second point, the guide unit 18 at a third point, and the guide unit 24 at a fourth point, is moreover, parallel to the longitudinal direction 26 of the tabletop unit 10, and the third and the fourth points lie on the line between the first and the second points.

The second adjustment unit 16 is attached by an attachment element 36 to the guide unit 24 with respect to a longitudinal direction 26 of the tabletop unit 10.

The first adjustment unit 14 and the threaded spindle 40 have a shorter spacing from a longitudinal end 20 of the ground contact unit 12 than the first guide unit 18. The spacing between the first adjustment unit 14 and the longitudinal end 20 of the ground contact unit is smaller than about 1/10th of the maximum length of the ground contact unit 12 in the longitudinal direction 26.

Figure 2:
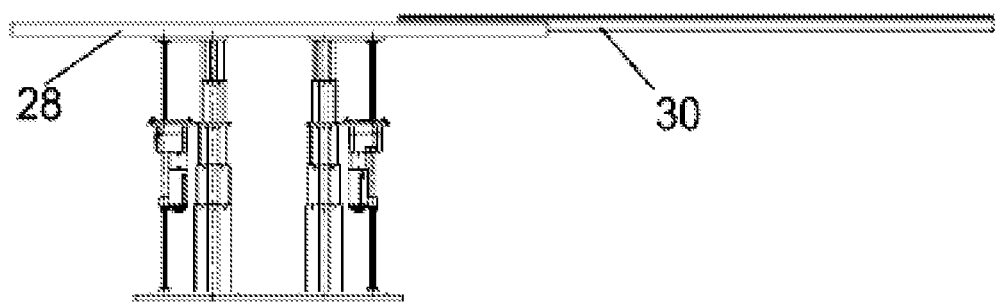
FIG. 2 shows a side view of the table of FIG. 1 with the tabletop unit in a second operating configuration.

The tabletop unit includes a first element 28 and a second element 30. The second element 30 is extractable (can be pulled out) relative to the first element 28. The second element is shown retracted in FIG. 1 and pulled out in FIG. 2. During an operating procedure, a patient lies on the element 30. By extracting or pulling out the element 30 relative to the element 28, the patient can be moved into a medical device such as a magnetic resonance imaging (MRI) scanner. Beneficially, the special design of the table prevents a tipping of the table.

Viewed from below, the ground contact unit 12 has a rectangular shape.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide an improved table having at least one guide unit.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10 Tabletop unit
12 Ground contact unit
14 Adjustment unit
16 Adjustment unit
18 Guide unit
20 End
22 Spacing
24 Guide unit
26 Longitudinal direction
28 Element
30 Element
32 Drive
34 Attachment element
36 Attachment element
38 Threaded spindle
40 Threaded spindle

What is claimed is:

1. A table for supporting a patient, the table comprising:
at least one tabletop unit,
at least one ground contact unit for transmitting at least a substantial portion of a weight of the table to the ground,
a first and at least one second adjustment unit for adjusting a spacing between the ground contact unit and the tabletop unit, wherein the first adjustment unit comprises at least one support and a motor, the motor being configured to travel in first and second opposite directions along the at least one support, and wherein a first end of the at least one support is attached to the at least one tabletop unit, and a second end of the at least one support is attached to the at least one ground contact unit, and
at least one first guide unit for guiding movements of the tabletop unit relative to the ground contact unit, wherein the at least one first guide unit is attached to the first adjustment unit between the first and second ends of the first adjustment unit, and wherein at least a part of the at least one first guide unit is disposed between the first adjustment unit and the at least one second adjustment unit,
wherein the first adjustment unit, the at least one second adjustment unit, and the at least one first guide unit are all arranged perpendicular to and on a straight line parallel to a longitudinal direction of the tabletop unit.

2. The table according to claim 1, wherein the first adjustment unit has a shorter spacing from a longitudinal end of the ground contact unit than the first guide unit.

3. The table according to claim 1, wherein a spacing between the first adjustment unit and a longitudinal end of the ground contact unit with respect to a longitudinal direction of the tabletop unit, is smaller than one fifth of the maximum length of the ground contact unit in the longitudinal direction.

4. The table according to claim 1, further comprising a second guide unit disposed at least partially between the first adjustment unit and the at least one second adjustment unit.

5. The table according to claim 4, wherein the second guide unit is arranged in a straight line with the first adjustment unit, the at least one second adjustment unit, and the at least one first guide unit.

6. The table according to claim 1, wherein the first adjustment unit, the at least one first guide unit, and the at least one second adjustment unit are disposed one-behind-the-other with respect to a longitudinal direction of the tabletop unit.

7. The table according to claim 1, wherein the tabletop unit includes a first element and at least one second element and wherein the at least one second element is movable relative to the first element.

8. The table according to claim 1, wherein the at least one first adjustment unit includes a threaded spindle.

9. The table according to claim 1, wherein the at least one first adjustment unit is fixed in relation to at least one direction of the at least one first guide unit.

10. The table according to claim 1, further comprising a second guide unit disposed at least partially between the first adjustment unit and the at least one second adjustment unit,
wherein the first adjustment unit has a shorter spacing from a longitudinal end of the ground contact unit than the first guide unit, and wherein the at least one first adjustment unit includes a threaded spindle.

11. The table according to claim 10,
wherein a spacing between the first adjustment unit and a longitudinal end of the ground contact unit with respect to a longitudinal direction of the tabletop unit is smaller than one fifth of the maximum length of the ground contact unit in the longitudinal direction,
wherein the first adjustment unit, the at least one first guide unit, and the at least one second adjustment unit are disposed one-behind-the-other with respect to a longitudinal direction of the tabletop unit, and
wherein the tabletop unit includes a first element and at least one second element and wherein the at least one second element is movable relative to the first element.

12. A table for supporting a patient, the table comprising:
a tabletop unit comprising a first element and a second element extendable relative to the first element,
a base for supporting the tabletop unit on the ground,
at least one telescopic guide connected between the tabletop unit and the base;
first and second drive units connected between the tabletop unit and the base, each of the first and second drive units comprising at least one support and a motor connected between the at least one support and the at least one telescopic guide, the motor being configured to travel in first and second opposite directions along the at least one support,
wherein the first and second drive units and the at least one telescopic guide are all arranged perpendicular to and on a straight line parallel to a longitudinal direction of the tabletop unit, and
wherein a first end of the at least one support is attached to the tabletop unit, and a second end of the at least one support is attached to the base, wherein the at least one telescopic guide is attached to the first drive unit between the first and second ends of the at least one support, and wherein at least a part of the at least one telescopic guide is disposed between the first drive unit and the second drive unit.

13. The table according to claim 12, wherein the at least one support comprises a threaded spindle and wherein the motor comprises a spindle nut drivable along the threaded spindle.

14. The table according to claim 12, wherein the at least one support comprises first and second spaced supports and wherein the motor is connected to the first support and to the second support.

15. The table according to claim 12, wherein the at least one support comprises a first threaded spindle extending from the base and a second threaded spindle extending from the tabletop unit, wherein the first drive unit comprises a first spindle nut on the first threaded spindle and a second spindle nut on the second threaded spindle and wherein the motor is operatively connected to the first spindle nut and to the second spindle nut and configured to drive the first and second spindle nuts along the first and second threaded spindles.

16. A table for supporting a patient, the table comprising:
a tabletop unit comprising a first element and a second element extendable relative to the first element, the tabletop unit having first and second longitudinally spaced ends,
a base supporting the tabletop unit on the ground, the base having first and second longitudinally spaced ends,
first and second telescopic guides connected between the tabletop unit and the base;
first and second upper threaded spindles projecting from the tabletop unit toward the base, the first upper threaded spindle being connected to the tabletop unit between the first end of the tabletop unit and the first telescopic guide and the second upper spindle being connected to the tabletop unit between the second end of the tabletop unit and the second telescopic guide;
first and second lower threaded spindles projecting from the base toward the tabletop unit, the first lower threaded spindle being connected to the base between the first end of the base and the first telescopic guide and the second lower threaded spindle being connected to the base between the second end of the base and the second telescopic guide,
a first upper spindle nut on the first upper threaded spindle and a first lower spindle nut on the first lower threaded spindle, and
a first motor operatively connected to the first upper spindle nut, the first lower spindle nut and the first telescopic guide, the first motor being configured to drive the first upper spindle nut and the first lower spindle nut toward and away from the base, wherein the first motor is connected to the first telescopic guide between where the first upper threaded spindle is connected to the tabletop unit and where the first lower threaded spindle is connected to the base
wherein the first and second telescoping guides, at least one of the first upper threaded spindle or the first lower threaded spindle, at least one of the second upper threaded spindle or the second lower threaded spindle, and the first motor are all arranged perpendicular to and on a straight line parallel to a longitudinal direction of the tabletop unit.

17. The table according to claim 16, further including a second upper spindle nut on the second upper threaded spindle and a second lower spindle nut on the second lower spindle, and a second motor operatively connected to the second upper spindle nut, the second lower spindle nut and the second telescopic guide, the second motor being configured to drive the second upper spindle nut and the second lower spindle nut toward and away from the base.

* * * * *